Dec. 5, 1961     J. G. RAY ET AL     3,012,168
FLUORESCENT LAMP
Filed March 23, 1960

JOHN G. RAY
WARREN C. GUNGLE
INVENTORS
BY
ATTORNEY 3,012,168
FLUORESCENT LAMP
John G. Ray, Topsfield, and Warren C. Gungle, Danvers, Mass., assignors to Sylvania Electric Products Inc., a corporation of Delaware
Filed Mar. 23, 1960, Ser. No. 17,097
8 Claims. (Cl. 313—221)

This invention relates to a glass composition for use in phosphor-coated electric discharge lamps. More particularly, the invention relates to the use of a glass composition for use in an aperture type of fluorescent lamp.

Fluorescent lamps, as presently made, have electrodes, mercury vapor, a phosphor coating and use a soda-lime glass envelope material; that is, one having an alkali-soda ($Na_2O$) content higher than approximately 15%. During the lamp processing, the glass envelope is baked at a temperature of 500 to 550° C. to remove the binder from the phosphor. In addition, during evacuation, the envelope is reheated to approximately 400° C. to facilitate the removal of molecules of gas adsorbed on the glass and phosphor surfaces.

Each of these bake-outs is quite necessary; however, each tends to diffuse alkali from the glass of the envelope to the surface. During lamp operation, mercury ions strike this alkali covering and a black-brown deposit of a mercury-alkali amalgam is formed. It is apparent that any dark discoloration will reduce the light transmission since the absorbed light will be converted to heat.

While this glass envelope finds particular use in an aperture type of lamp, it is apparent that similar glass compositions may also be used in conventional fluorescent lamps with similar superior results.

It is an object of this invention to provide a lamp in which the glass envelope will not darken upon use because of the action of the mercury ions.

It is a further object of this invention to provide a glass composition for an aperture type fluorescent lamp in which the aperture does not darken upon use.

Other features, objects and advantages will become apparent from the following description, taken in connection with the accompanying drawings.

An aperture lamp is a very high output type of fluorescent lamp which is designed with a phosphor coating extending part way around the lamp and in such a manner as to leave a slot of clear glass throughout the length of the lamp. The purpose of this construction is to concentrate a beam of light through the clear glass section.

Figure 1:
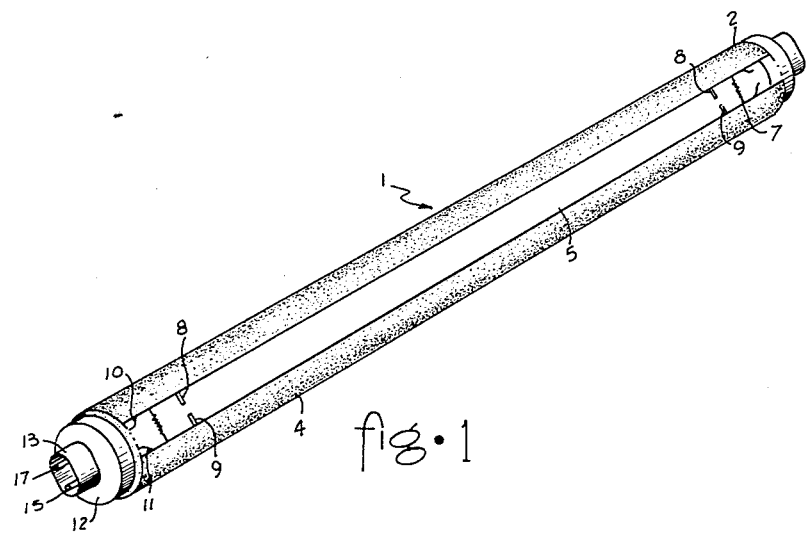
FIGURE 1 shows one embodiment of a device according to this invention.
Figure 2:
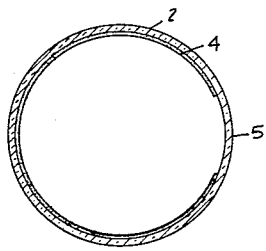
FIGURE 2 shows a cross-section through the middle of the device.

In FIGURE 1, the lamp 1 has a sealed hollow glass tube 2 containing a filling of 85% argon and 15% helium therein (although other suitable gas fillings can be used), with enough mercury to produce a vapor pressure of about 10 microns. On the inside surface of the tube 2 there is a coating 4 of the phosphor, for example calcium halophosphate activated with antimony and manganese or any other suitable fluorescent lamp phosphor. This coating is shown in section in FIGURE 2 and extends around about 315° of the circumference of the tube, the other 45° portion 5 being left free of coating to allow the light to emerge therethrough. Other sizes of aperture, for example between about 20° and 90°, can be used, the brightness in the aperture area increasing as the aperture is reduced.

At each end of the glass tube 1, there is an electrode comprising an oxide-coated tungsten coil 6, two auxiliary anodes 8, 9 and the support and lead-in wires 10, 11 as shown for example in a United States patent application Serial No. 742,928, filed June 18, 1958, by John F. Waymouth et al. for a Flourescent Lamp, and assigned to the assignee of the present application. The usual insulating plastic base 12, with the boss 13 carrying contacts 14, 15 can be as shown for example in United States Patent 2,896,187, issued July 21, 1959, to R. B. Thomas and S. C. Shappell for a Lamp Base or some other suitable base can be used.

The coating may be applied at first over the entire glass envelope by methods well known in the art and then scraped or brushed off from the aperture 5 of the glass tube 2, as desired.

It has been determined that the use of a reduced alkali boro-silicate glass envelope 2 having the oxide composition described in column I of Table I darkens at a substantially lesser rate than the ordinary soda-lime glass currently in use. The soda-lime glass has an oxide composition described in column II of Table I. In addition, the improved glass has similar physical properties which enable it to be used as a direct replacement in the lamp fabrication operations currently in use. Such properties may be for example a softening point near 700° C., an annealing point of about 520° C. and a strain point about 480° C.

TABLE I

Composition of glass expressed as an oxide composition

| Components | Column I | | Column II, percent |
|---|---|---|---|
| | Range, percent | Preferred, percent | |
| $SiO_2$ | 65–75 | 70 | 73.6 |
| $Na_2O$ | 10–12 | 12 | 16.0 |
| $K_2O$ | 4–6 | 6 | .6 |
| $Al_2O_3$ | 2–3 | 2 | 1.0 |
| $CaO$ | 3–6 | 4 | 5.2 |
| $MgO$ | 2–4 | 3 | 3.6 |
| $B_2O_3$ | 3–4 | 3 | |

It has been found that the sodium in an alkali glass can be tied down chemically so that it will not diffuse out of the glass. This is accomplished by the addition of alumina to the extent of about 2%. The alumina reacts with the soda to yield $NaAlO_2$ groups which are stable. In addition, boron added to the glass will form $NaBo_2$ groups. These groups in themselves do not possess substantial stability, but the boron yields phase separation. Regions will exist in the glass consisting of $NaBO_2$ groups surrounded by $SiO$ groups. The sodium ions will diffuse within the boron phase but will be hindered from diffusing from this phase due to the sodium-free silica phase thereby acting as a diffusion barrier.

With the glass of this invention, mercury blackening is reduced. This reduction in blackening is the result of the reduction of sodium on the surface of the inside of the lamp. This, in turn, is the result of the absence of, or a great reduction in, the rate of sodium diffusion through the glass at elevated temperatures, such as found during lamp processing.

The marked reduction in discoloration made possible by the use of glass of this invention over the ordinary soda-lime glass is apparent from the following table.

TABLE II

[Percent maintenance from 0 hours]

| Glass | 100 hours, percent | 500 hours, percent |
|---|---|---|
| Soda-lime glass | 82 | 62.3 |
| Reduced soda, borosilicate glass | 94 | 89 |

The brightness of a lamp utilizing the glass of this invention contrasted to a lamp utilizing the conventional soda-lime glass is illustrated by the following table. The average brightness shown in Table III on the surface is measured in foot lamberts.

TABLE III

| Glass | 0 hours | 100 hours | 500 hours |
|---|---|---|---|
| Soda-lime glass | 24,000 | 19,700 | 15,500 |
| Reduced soda, borosilicate glass | 24,000 | 22,500 | 21,400 |

This reduction in discoloration and the resulting increase in brightness is attributed to changes in the batch composition.

An increase of the $Al_2O_3$ concentration of about 1 or 2% greatly aids in tying up a portion of the alkali (expressed as $Na_2O$ and $K_2O$) which would otherwise be available to react with the mercury. The changing of the ratio of the alkali components by reducing the $Na_2O$ and increasing the $K_2O$ tends to make a more tightly bonded glass. Thus the total alkali will be tied to a higher degree into the silica network leaving less free alkali to react with the mercury. The addition of the $B_2O_3$ compensates for the addition of the $Al_2O_3$ in order to produce a glass having similar physical properties to the ordinary soda-lime glass. This $B_2O_3$ has the further advantage of being a secondary glass former, thereby giving a more complex system and helping to tie up the alkali compounds.

It is apparent that other changes may be made by one skilled in the art. Applicants wish only to be limited in the scope of their invention by the appended claims.

What we claim is:

1. A fluorescent lamp comprising a glass envelope; mercury vapor and means through which an electric discharge is produced in said envelope; a phosphor coating on the interior surface of said envelope, said envelope comprising ingredients expressed as an oxide composition of $SiO_2$ between about 65% and 75%, $Na_2O$ between about 10% and 12%, $K_2O$ between about 4% and 6%, $Al_2O_3$ between about 2% and 3%, CaO between about 3% and 6%, MgO between about 2% and 4%, $B_2O_3$ between about 3% and 4%.

2. A fluorescent lamp comprising a glass envelope; mercury vapor and means through which an electric discharge is produced in said envelope; a phosphor coating on the interior surface of said envelope, said envelope comprising ingredients expressed as an oxide composition of about 70% $SiO_2$, about 12% $Na_2O$, about 6% $K_2O$, about 2% $Al_2O_3$, about 4% CaO, about 3% MgO and about 3% $B_2O_3$.

3. A fluorescent lamp having a glass envelope; mercury vapor and means through which an electric discharge is produced in said envelope; a phosphor coating around a major portion of the interior surface of said envelope, said envelope comprising ingredients expressed as an oxide composition of $SiO_2$ between about 65 and 75%, $Na_2O$ between about 10 and 12%, $K_2O$ between about 4 and 6%, $Al_2O_3$ between about 2 and 3%, CaO between about 3 and 6%, MgO between about 2 and 4%, $B_2O_3$ between about 3 and 4%.

4. A fluorescent lamp comprising a glass envelope; mercury vapor and means through which an electric discharge is produced in said envelope, a phosphor coating around a major portion of the interior surface of said lamp, said envelope comprising ingredients expressed as an oxide composition of about 70% $SiO_2$, about 12% $Na_2O$, about 6% $K_2O$, about 2% $Al_2O_3$, about 4% CaO, about 3% MgO and about 3% $B_2O_3$.

5. The fluorescent lamp according to claim 3 wherein the phosphor is coated around 340 to 270° of the interior surface of said glass envelope.

6. The fluorescent lamp according to claim 4 wherein the phosphor is coated around 340 to 270° of the interior surface of said glass envelope.

7. A fluorescent lamp having a glass envelope; mercury vapor and means through which an electric discharge is produced in said envelope; a phosphor coating around a major portion of the interior surface of said envelope; said envelope comprising a reduced soda boron containing, silicate glass containing ingredients expressed as an oxide composition of 10 to 12% $Na_2O$, 4 to 6% $K_2O$, 2 to 3% $Al_2O_3$ and 3 to 4% $B_2O_3$.

8. A fluorescent lamp having a glass envelope; mercury vapor and means through which an electric discharge is produced in said envelope; a phosphor coating on the interior surface of said envelope; said envelope comprising a reduced soda boron containing, silicate glass containing ingredients expressed as an oxide composition of 10 to 12% $Na_2O$, 4 to 6% $K_2O$, 2 to 3% $Al_2O_3$ and 3 to 4% of $B_2O_3$.

References Cited in the file of this patent

UNITED STATES PATENTS

| | | |
|---|---|---|
| 1,969,277 | Pirani | Aug. 7, 1934 |
| 2,001,504 | Schmidt | May 14, 1935 |
| 2,152,988 | Elenbaas | Apr. 4, 1939 |
| 2,205,809 | Breadner | June 25, 1940 |
| 2,407,379 | Morehouse | Sept. 10, 1946 |
| 2,719,932 | Stanworth | Oct. 4, 1955 |